(12) United States Patent
Park et al.

(10) Patent No.: US 6,373,902 B1
(45) Date of Patent: Apr. 16, 2002

(54) DEVICE AND METHOD FOR LINEARIZING TRANSMITTER IN DIGITAL COMMUNICATION SYSTEM

(75) Inventors: Jae-Sun Park, Suwon; Gin-Kyu Choi; Ji-Won Ha, both of Seoul, all of (KR)

(73) Assignee: Samsung Electronics Co., LTD (KR)

(*) Notice: Subject to any disclaimer, the term of this patent is extended or adjusted under 35 U.S.C. 154(b) by 0 days.

(21) Appl. No.: 09/100,331

(22) Filed: Jun. 19, 1998

(30) Foreign Application Priority Data

Jun. 19, 1997 (KR) ............................................ 97/25705
Jun. 20, 1997 (KR) ............................................ 97/26137
Oct. 10, 1997 (KR) ............................................ 97/52132

(51) Int. Cl.[7] .......................... H04K 1/02; H04L 25/03; H04L 25/49
(52) U.S. Cl. ......................... 375/296; 332/124; 332/159
(58) Field of Search ............................... 375/296, 295, 375/297, 259, 285, 254; 455/126, 115, 63; 330/49; 327/317; 332/123, 124, 159, 160, 162

(56) References Cited

U.S. PATENT DOCUMENTS

| | | | |
|---|---|---|---|
| 4,291,277 A | 9/1981 | Davis et al. ................. 330/149 |
| 4,879,519 A | 11/1989 | Myer .......................... 330/149 |
| 4,890,300 A | 12/1989 | Andrews ..................... 375/297 |
| 5,049,832 A | 9/1991 | Cavers ........................ 330/149 |
| 5,105,445 A | 4/1992 | Karam et al. ................ 375/296 |
| 5,107,520 A | 4/1992 | Karam et al. ................ 375/296 |
| 5,113,414 A | 5/1992 | Karam et al. ................ 375/296 |
| 5,148,448 A | 9/1992 | Karam et al. ................ 375/298 |
| 5,193,224 A | 3/1993 | McNicol et al. ............ 455/126 |
| 5,251,328 A | 10/1993 | Shaw .......................... 455/73 |
| 5,404,378 A | * 4/1995 | Kimura ....................... 375/296 |
| 5,524,285 A | 6/1996 | Wray et al. ................. 455/126 |
| 5,524,286 A | 6/1996 | Chiesa et al. ............... 455/126 |
| 5,574,990 A | 11/1996 | Flanagan .................... 455/115 |
| 5,722,056 A | 2/1998 | Horowitz et al. ........... 455/126 |
| 5,732,333 A | 3/1998 | Cox et al. ................... 455/126 |
| 5,898,338 A | * 4/1999 | Proctor et al. .............. 330/149 |
| 5,903,823 A | * 5/1999 | Moriyama et al. ......... 455/126 |
| 5,930,301 A | * 7/1999 | Chester et al. .............. 375/296 |
| 5,949,283 A | * 9/1999 | Proctor et al. .............. 330/149 |
| 6,081,698 A | * 6/2000 | Moriyama et al. ......... 455/126 |
| 6,091,941 A | * 7/2000 | Moriyama et al. ......... 455/126 |

* cited by examiner

Primary Examiner—Jean Corrielus (57) ABSTRACT

A device for linearizing a transmitter in a digital radio communication system. In the device, a predistortion lookup table stores predistortion data determined by measuring in advance distortion characteristics of the transmitter with respect to input baseband data. During transmission, the device synthesizes the input baseband data with the predistortion data to predistort the input data so as to compensate for the distortion characteristics caused by non-linear elements constituting the transmitter.

13 Claims, 7 Drawing Sheets

DEVICE AND METHOD FOR LINEARIZING TRANSMITTER IN DIGITAL COMMUNICATION SYSTEM

CLAIM FOR PRIORITY

This application makes reference to, incorporates the same herein, and claims all benefits accruing under 35 U.S.C. §119 from applications for LINEARIZING DEVICE AND METHOD FOR A RADIO COMMUNICATION SYSTEM earlier filed in the Korean Industrial Property Office on the 19th of June 1997, and there duly assigned Ser. No. 25705/1997, RADIO COMMUNICATION SYSTEM EMPLOYING A PREDISTORTION METHOD earlier filed in the Korean Industrial Property Office on the 20th of June 1997, and there duly assigned Ser. No. 26137/1997, and APPARATUS AND METHOD FOR LINEARIZING POWER AMPLIFIER USING PREDISTORTION IN DIGITAL COMMUNICATION SYSTEM earlier filed in the Korean Industrial Property Office on the 10th of October 1997, and there duly assigned Serial No. 52132/1997 copies of which applications are annexed hereto.

BACKGROUND OF THE INVENTION

1. Technical Field

The present invention relates to a digital predistortion technique for linearizing a power amplifier in a digital communication system, and in particular, to a communication system using a digital predistortion technique to compensate for distortion of an output spectrum caused by non-linear characteristics of a power amplifier.

2. Related Art

In a radio communication system, a transmitter for transmitting an analog signal or digital data is composed of a large number of active elements including a power amplifier. These active elements are designed to increase power efficiency and spectrum efficiency of the radio communication system. However, modulation scheme such as quadrature phase-shift key (QPSK) and quadrature amplitude modulation (QAM), which is commonly used by the radio communication system for transmission, exhibits non-constant envelope characteristics. Consequently, radio communication system which uses these modulation schemes has higher spectrum efficiency but lower power efficiency.

These modulation schemes cause serious distortion of baseband data when the baseband data passes through the active elements of the transmitter due to their non-linear transfer characteristics. Generally, data distortion can be avoided if the transmitter uses only a linear region of active elements for data transmission. However, the power efficiency of the transmitter may be lowered and the transmission performance of the radio communication system may be deteriorated.

In order to maximize the power efficiency of the transmitter while preventing distortion in the baseband data, there have been proposed several methods of preventing distortion of the data spectrum, caused by the active elements, especially, by the power amplifier. One of the proposed methods is a predistortion technique which adaptively pursues the non-linear characteristics of the power amplifier and predistorts the baseband data reversely, so as to compensate for the distortion. Exemplars of predistortion techniques are disclosed, for example, in U.S. Pat. No. 4,291,277 for Adaptive Predistortion Technique For Linearizing A Power Amplifier For Digital Data System issued to Davis et al., U.S. Pat. No. 4,879,519 for Predistortion Compensated Linear Amplifier issued to Myer, U.S. Pat. No. 4,890,300 for Radio Transmitters issued to Andrews, U.S. Pat. No. 5,049,832 for Amplifier Linearization By Adaptive Predistortion issued to Cavers, U.S. Pat. No. 5,105,445 for Predistortion Arrangement For A Digital Transmission System issued to Karam et al., U.S. Pat. No. 5,107,520 for Adaptive Predistortion Circuit For A Digital Transmission System issued to Karam et al., U.S. Pat. No. 5,113,414 for Predistortion Arrangement For A Digital Transmission System issued to Karam et al., U.S. Pat. No. 5,148,448 for Adaptive Predistortion Circuit With Memory issued to Karam et al., U.S. Pat. No. 5,193,224 for Adaptive Phase Control For A Power Amplifier Predistorter issued to McNicol et al., U.S. Pat. No. 5,251,328 for predistortion Technique For Communication System issued to Shaw, U.S. Pat. No. 5,524,285 for Radio Transmitter With Power Amplifier And Linearization issued to Wray et al., U.S. Pat. No. 5,524,286 for Baseband Predistortion System For The Adaptive Linearization Of Power Amplifiers issued to Chiesa et al., U.S. Pat. No. 5,574,990 for Predistortion Technique For Communication Systems issued to Flanagan, U.S. Pat. No. 5,722,056 for Radio Transmitter With Power Amplifier Linearizer issued to Horowitz et al., and U.S. Pat. No. 5,732,333 for Linear Transmitter Using Predistortion issued to Cox et al.

A typical predistortion scheme seeks to predistort the baseband data to compensate for the non-linearity of a power amplifier. The transmitter must contain additional hardware elements for feeding back the transmission output signal for predistortion, which makes the structure complex and exhibits low power efficiency. Thus, most transmitters using conventional predistortion schemes, as we have observed, may be unsuitable for a small radio communication system such as a portable terminal using a battery, because the low power efficiency may lead to shorter operable duration of the battery.

SUMMARY OF THE INVENTION

Accordingly, it is therefore an object of the present invention to provide a compact transmission apparatus using a predistortion technique that is simple, easy to realize and inexpensive.

It is also an object to provide a compact transmission apparatus using a predistortion technique to compensate for non-linear distortion of a transmission signal.

It is another object to provide a device and method for linearizing a power amplifier for operation in all regions including a non-linear region by compensating for distortion of a transmission signal according to a power control signal.

It is still another object to provide a device and method for predistorting baseband data according to distortion characteristics of a radio transmitter stored in a predistortion lookup table so as to compensate for the non-linear distortion of a transmission signal.

These and other objects of the present invention may be achieved by a device for linearizing a transmitter in a digital radio communication system having a predistortion lookup table storing predistortion data determined, in advance, the distortion characteristics of the transmitter with respect to input baseband data. During transmission, the device synthesizes the input baseband data with the predistortion data to predistort the input data so as to compensate for the distortion characteristics caused by non-linear elements of the transmitter.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
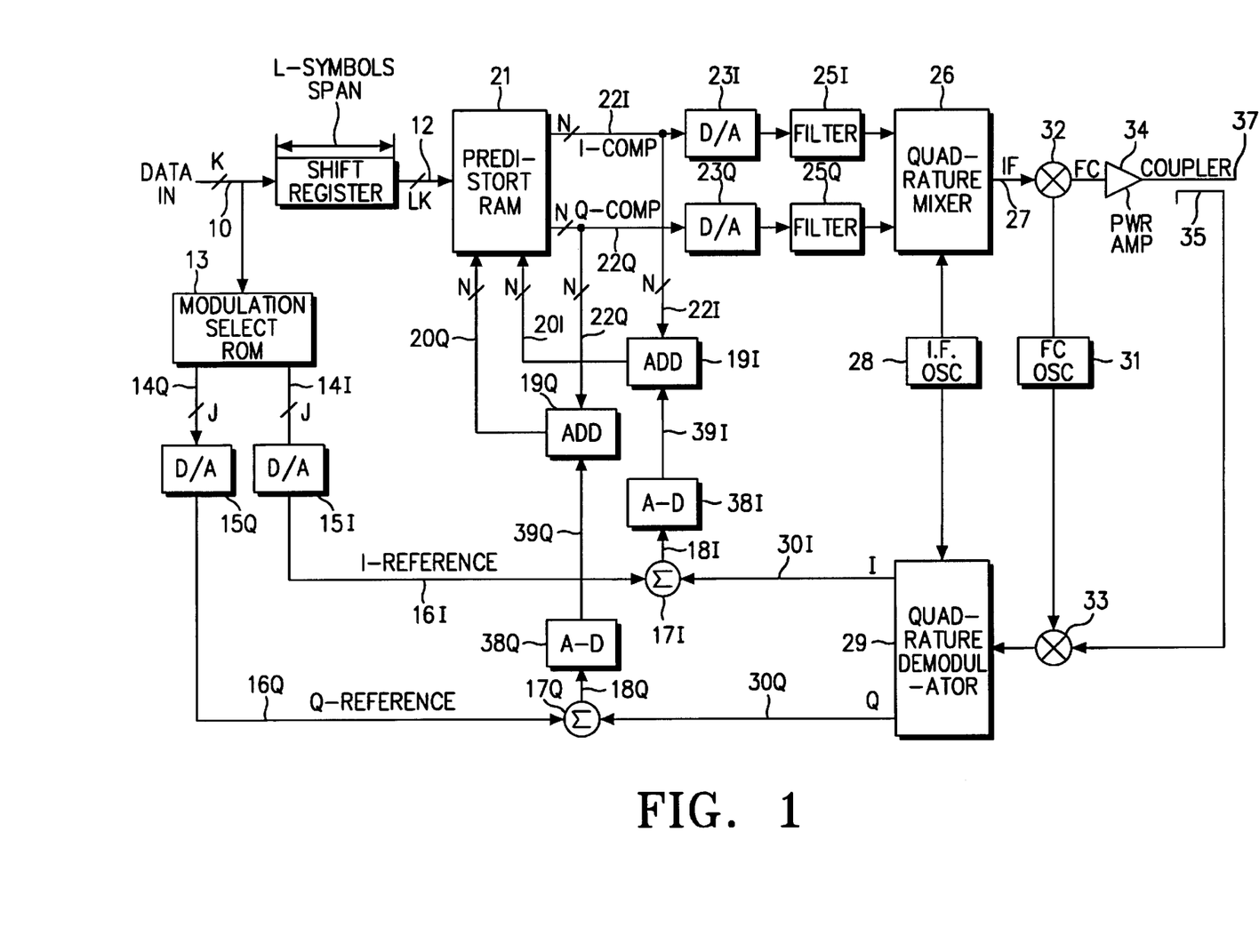
FIG. 1 is a block diagram of a communication system using a typical predistortion technique to compensate for distortion of a transmission signal.

Referring now to the drawings and particularly to FIG. 1, which illustrates a communication system using a typical predistortion technique to compensate for distortion of a transmission signal. Referring to FIG. 1, digital data K to be transmitted in accordance with quadrature amplitude modulation (QAM) format is coupled to input line 10 to shift register 11 having a capacity of L symbols and to the address input of a modulation select read-only-memory (ROM) 13. Digital data K is also used to access a pair of J-bit words in ROM 13 each representative of an in-phase (I) reference voltage component, read out on line 14I, and a quadrature-phase (Q) reference voltage component, read out on line 14Q, to be transmitted in accordance with the digital data K received at input line 10. The digital values of the J-bit words are converted into analog format by digital-to-analog (D/A) converters 15I and 15Q, respectively. The analog values of the reference voltages are coupled over lines 16I and 16Q to comparators 17I and 17Q, respectively, to be subtracted from signals fed back from the output of non-linear power amplifier 34. Error signals produced by comparators 17I and 17Q are used to update digital codes stored in a predistortion random-access-memory (RAM) 21 in a direction such as to reduce the distortion.

Predistortion RAM 21 is addressed by the contents of shift register 11, so that RAM 21 produces an N-bit in-phase component word and an N-bit quadrature-phase component word that which represent predistortion digital values at output lines 22I and 22Q. These predistortion digital values are converted into analog format by respective digital-to-analog (D/A) converters 23I and 23Q, filtered by respective filters 25I and 25Q, and applied to quadrature mixer 26 for mixing with an IF s frequency from oscillator 28 to produce a predistorted IF signal on line 27.

The predistorted IF signal is multiplied in mixer 32 by a carrier frequency output fc of carrier oscillator 31 and the resulting up-converted RF signal is applied to power amplifier 34 for amplification and transmission via antenna 37. A small amount of the output of power amplifier 34 is coupled by RF coupler 35 and fed back to mixer 33 for down-conversion to an IF signal in response to a carrier frequency fc from carrier frequency oscillator 31. The IF signal is separated into respective I and Q components at lines 30I and 30Q by quadrature demodulator 29. The respective I and Q components from lines 30I and 30Q are compared with the I reference and Q reference components from lines 16I and 16Q, and the outputs of comparators 17I and 17Q are converted into digital format by analog-to-digital (A/D) converters 38I and 38Q to be added by adders 19I and 19Q for controlling write-in data of predistortion RAM 21.

Digital data is distorted when passing through the non-linear elements in the transmitter (consisting of, for example, a modulator 26 and a power amplifier 34). In particular, the power amplifier 34 may seriously distort the transmission signal by amplifying the transmission signal non-linearly. For example, the modulation such as QPSK or QAM having the non-constant envelope characteristics restricts the sidelobe output power which affects the adjacent channels. The sidelobe power in the baseband may increase due to the non-linear amplification by the active elements, while the baseband transmission signal passes the non-linear elements during the course of quadrature modulation, up-conversion, and amplification. In order to maintain the low sidelobe power, it is necessary to operate the active elements in the linear region. However, to allow the active elements to operate in the linear region, it is necessary to provide the high DC power to the active elements, in particular, to the power amplifier at the final stage of the transmitter. In this situation, the active elements may have very low power efficiency. Such a communication system is, however, unsuitable for a portable communication system using a battery, because the low power efficiency may lead to reduced operable duration of the battery. Moreover, while the distortion introduced in a transmission signal is compensated by the communication system, the transmitter must contain additional hardware elements for feeding back the transmission output signal for predistortion, which makes the structure complex and exhibits low power efficiency.

Figure 2:
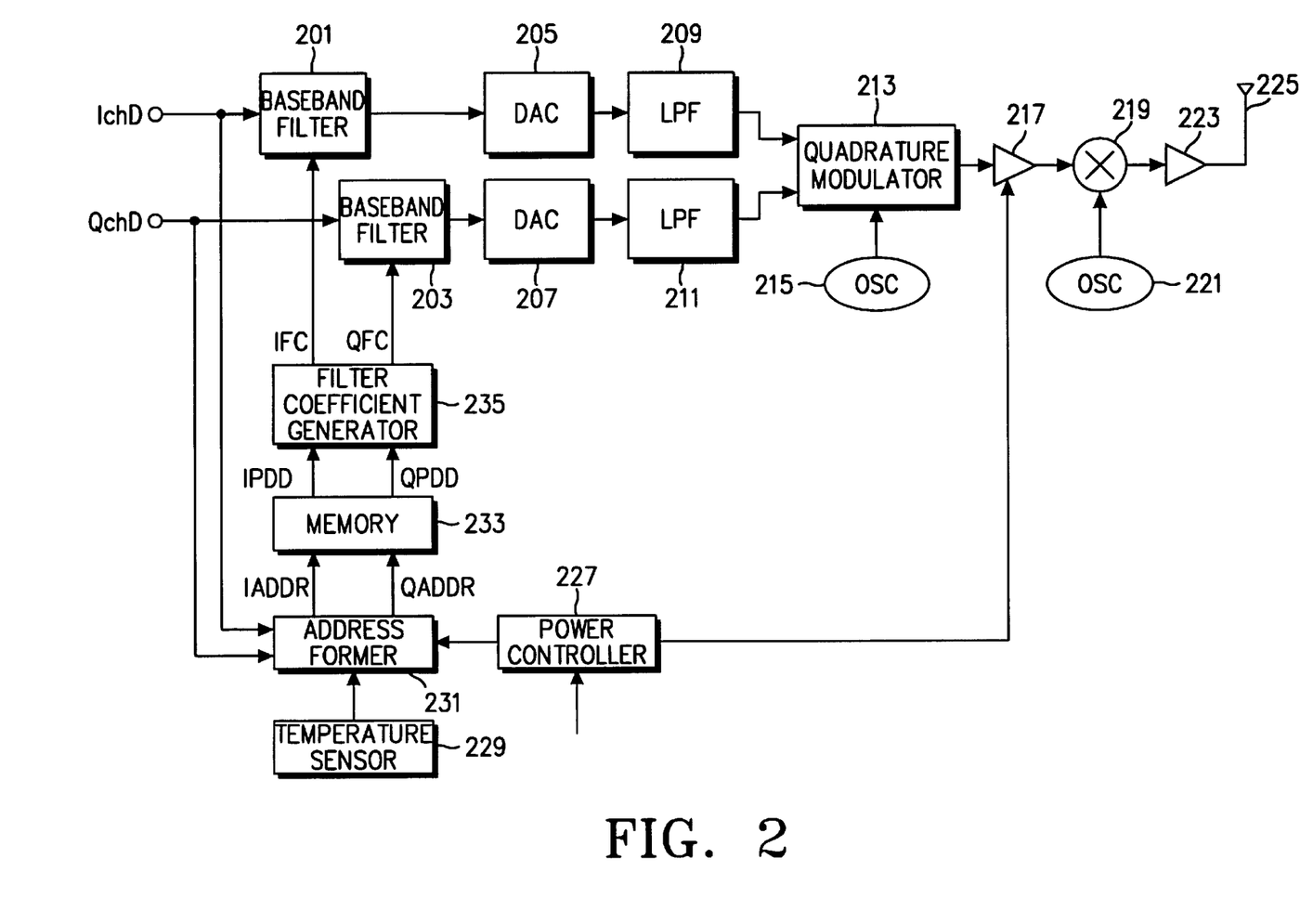
FIG. 2 is a block diagram of a communication system using a digital predistortion technique to compensate for distortion of a transmission signal according to a first embodiment of the present invention.

Turning now to FIG. 2 which illustrates a communication system using a digital predistortion technique to compensate for non-linear distortion of a transmission signal according to a first embodiment of the present invention. As shown in FIG. 2, the communication system using the predistortion technique of the present invention includes baseband filters 201 and 203, digital-to-analog converters (DACs) 205 and 207, low-pass filters (LPFs) 209 and 211, a quadrature modulator 213 that is responsive to a first oscillator 215, a gain control amplifier 217, a mixer 219 that is responsive to a second oscillator 221, a power amplifier 223 for amplifying a transmission signal for transmission via antenna 225, a power controller 227, a temperature sensor 229, and a predistortion data generation unit 230 consisting of an address former 231, a memory 233, and a filter coefficient generator 235. A transmitter consists of the quadrature modulator 213, the first oscillator 215, the gain control amplifier 217, the mixer 219, the second oscillator 221, and the power amplifier 223.

Referring to FIG. 2, the address former 231 of the predistortion data generation unit 230 which receives I-channel data IchD and Q-channel data QchD from input terminals IchD and QchD, forms I-channel address IADDR and Q-channel QADDR for predistortion lookup tables where the distortion characteristics of the transmitter are stored in advance for predistorting the baseband data IchD and QchD to compensate for the distortion of a transmission signal. The power controller 227 generates a transmission power control signal to the address former 231 under the control of a controller (not shown). The temperature sensor 229 senses the surrounding temperature of a transmitter and outputs a temperature sensing signal to the address former 231. The address former 231 forms, in turn, offset addresses according to changes of the surrounding temperature and the transmission power of the transmitter in response to the temperature sensing signal and the power control signal, thereby to offset the I- and Q-channel addresses IADDR and QADDR. Alternatively, the address former 231 can form the addresses IADDR and QADDR depending on only the channel data IchD and QchD, without using the temperature sensing signal and the power control signal. Alternatively, the address former 231 can also form the addresses IADDR and QADDR by using the channel data IchD and QchD, together with any one of the temperature sensing signal and the power control signal.

The memory 233 has the predistortion lookup tables for the I-channel and Q-channels, respectively, in which information for the whole distortion characteristics of the transmitter are stored. The respective predistortion lookup tables store predistortion data IPDD and QPDD determined by measuring in advance the distortion characteristics of the transmitter. The memory 233 provides predistortion data IPDD and QPDD according to the addresses IADDR and QADDR output from the address former 231. The filter coefficient generator 235 generates filter coefficients IFC and QFC for controlling the filter coefficients for the I-channel and Q-channels, respectively, according to the predistortion data IPDD and QPDD received from the memory 233.

Baseband filter 201 predistorts the input I-channel data IchD according to the filter coefficient IFC, and shapes the I-channel baseband data IchD to restrict the sidelobe power which may affect the adjacent channel. Similarly, baseband filter 203 predistorts the input Q-channel data QchD according to the filter coefficient QFC, and pulse-shapes the Q-channel baseband data QchD to restrict the sidelobe power which may affect the adjacent channel. The DAC 205 converts the predistorted I-channel baseband data output from the baseband filter 201 to an analog baseband signal. Likewise, DAC 207 converts the predistorted Q-channel baseband data output from the baseband filter 203 to an analog baseband signal. The LPF 209 lowpass-filters the I-channel baseband signal output from the DAC 205 to eliminate harmonics and spurious signals therefrom. Similarly, the LPF 211 lowpass-filters the Q-channel baseband signal output from the DAC 207 to eliminate harmonics and spurious signals therefrom.

Quadrature modulator 213 modulates the predistorted I-channel and Q-channel baseband signals output from the lowpass filters 209 and 211 at a modulation frequency generated from the first oscillator 215. The gain control amplifier 217 amplifies the modulated transmission signal output from the quadrature modulator 213 according to a transmission power control signal generated from the power controller 227. The mixer 219 mixes an output signal of the gain control amplifier 217 with a carrier frequency output from the second oscillator 221, to up-convert the transmission output signal to the radio frequency.

Power amplifier 223 then amplifies the transmission output signal of the mixer 219. Here, since the transmission output signal was predistorted in consideration of the whole distortion characteristics of the transmitter, the final transmission signal output from the power amplifier 223 may be free from the non-linear distortion. In essence, the communication system using the predistortion technique according to the first embodiment of the present invention predistorts the baseband data using the predistortion lookup tables to compensate for the non-linear distortion characteristics of the transmitter.

In operation, the baseband transmission signal is distorted while passing through the non-linear elements in the transmitter. In particular, the power amplifier 223 amplifies the transmission signal non-linearly, thereby resulting in the serious distortion of the baseband signal. For example, a modulation scheme such as QPSK or QAM having the non-constant envelope characteristic restricts the sidelobe power which affects the adjacent channel. Taking this into consideration, the baseband filters 201 and 203 shape the baseband data IchD and QchD so as to eliminate the unnecessary sidelobe power. Such baseband filters can be realized by a lowpass filter. In a cellular CDMA, IS-95, the baseband filters can be realized by a 49-tap FIR (Finite Impulse Response) filter.

Nevertheless, the sidelobe power increases due to the non-linear amplification by the non-linear elements of the transmitter, as the baseband transmission signal passes the non-linear elements during the quadrature modulation, up-conversion, and amplification. In order to decrease the sidelobe power, the inventive device has predistortion lookup tables in which the whole distortion characteristic information of the transmitter, measured in advance, is stored. The predistortion lookup tables prepared in the memory 233 have the distortion information determined by measuring the whole distortion characteristics of the transmitter with respect to the baseband signals. During transmission, the baseband transmission signal is reversely predistorted with reference to the predistortion lookup tables, before passing through the non-linear elements of the transmitter. As a result, the communication system compensates for the distortion of the baseband transmission signal, so that the power amplifier 223 may output the distortion-free transmission signal having a waveform similar to that of the baseband signal.

In accordance with the first embodiment of the invention, the communication system includes the baseband filters 201 and 203 for pulse-shaping the baseband data IchD and QchD to predistort them according to the filter coefficients IFC and QFC, so as to compensate for the distortion characteristics of the transmitter. The power amplifier 223 has the most significant influence on the distortion characteristics of the transmitter. The distortion characteristics of the transmitter depend on the amplitude and shape of the baseband signals applied to the active elements. Therefore, it is possible to evaluate the distortion characteristics of the transmitter, by knowing the input and/output power and the shape of the baseband signals applied to the active elements.

The measured distortion characteristic information of the transmitter is stored in predistortion lookup tables in the memory 233. The address former 231 generates the addresses IADDR and QADDR, based on the baseband data IchD and QchD, the temperature sensing signal, and the transmission power control signal. The memory 233 reads the predistortion information according to the addresses IADDR and QADDR provided from the address former 231, and outputs the predistortion data (or coefficients) IPDD and QPDD to the filter coefficient generator 235. Then, the filter coefficient generator 235 adds the predistortion filter coefficients IPDD and QPDD to a reference filter coefficient, to provide the baseband filters 201 and 203 with the filter coefficients IFC and QFC having the characteristics opposite to the distortion characteristics.

Figure 3:
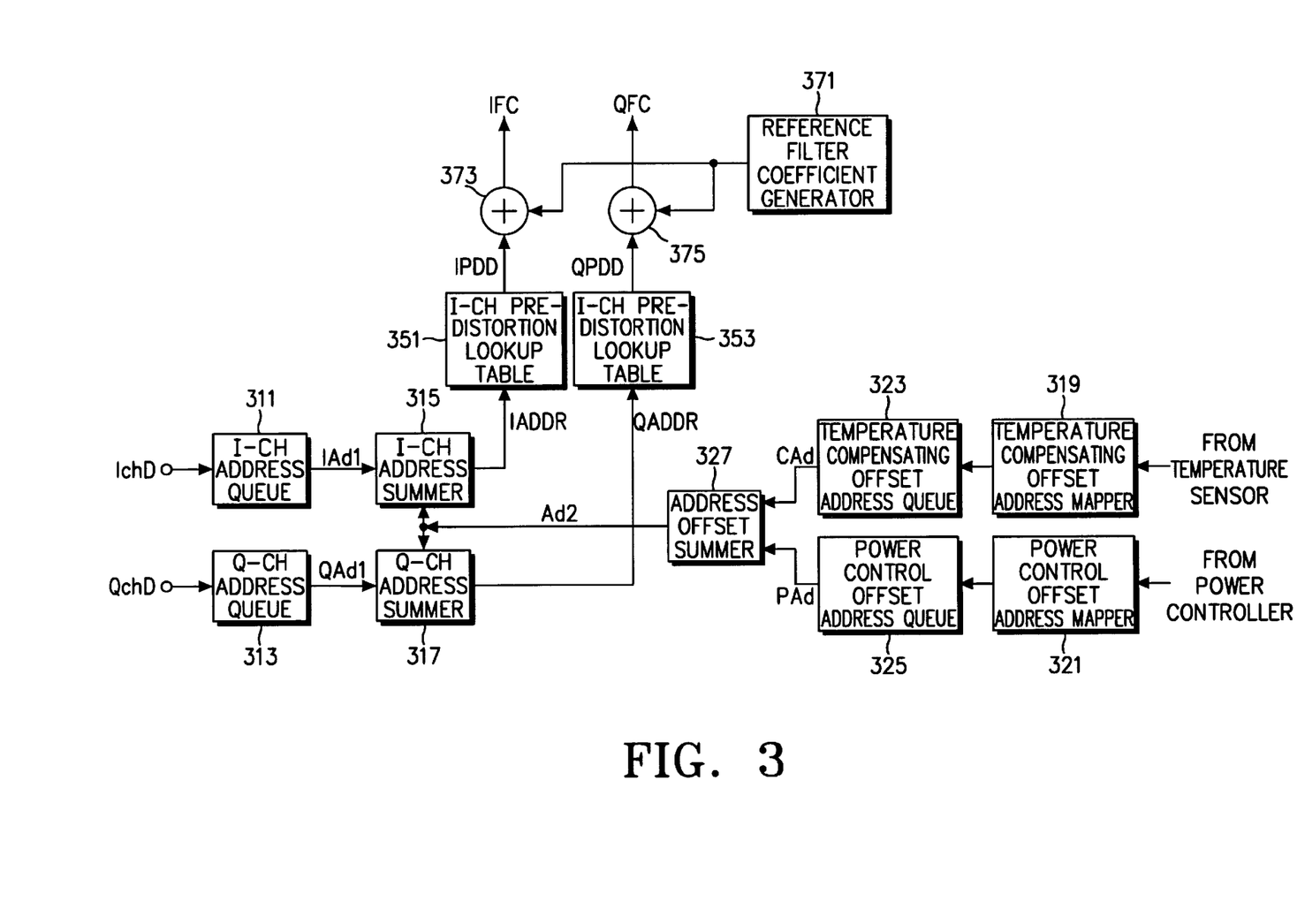
FIG. 3 is a block diagram of a predistortion data generation unit of FIG. 2.

FIG. 3 is a detailed circuit diagram of a predistortion data generation unit 230 composed of the address former 231, the memory 233, and the filter coefficient generator 235. Referring to FIG. 3, the input baseband data IchD is applied in common to the baseband filter 201 and an I-channel address queue 311. Similarly, the input baseband data QchD is applied in common to the baseband filter 203 and a Q-channel address queue 313. The address queues 311 and 313 which are initialized at the beginning, shift the input baseband data IchD and QchD from the MSB (Most Significant Bit) towards the LSB (Least Significant Bit). In case the transmitter does not employ the temperature and power compensation function, the outputs of the address queues 311 and 313 are directly applied to predistortion lookup tables 351 and 353 as the addresses IADDR and QADDR.

A temperature compensating offset address mapper 319 includes a temperature offset address table for storing address offset values corresponding to the surrounding temperature sensed, and maps the temperature sensing signal output from the temperature sensor 229 into the temperature offset address table to output a temperature offset address. A power control offset address mapper 321 includes a power offset address table for storing address offset values corresponding to the transmission power, and maps the transmission power control signal output from the power controller 227 into the power offset address table to output a power offset address. A temperature compensating offset address queue 323 which is initialized at the beginning, shifts the temperature offset address output from the temperature compensating offset address mapper 319 from the MSB towards the LSB, to generate a temperature offset address CAd. A power control offset address queue 325 which is initialized at the beginning, shifts the power offset address output from the power control offset address mapper 321 from the MSB toward the LSB, to generate a power offset address PAd. An address offset summer 327 sums the offset addresses CAd and PAd output from the address queues 323 and 325 to generate an offset address Ad2.

An I-channel address summer 315 adds I-channel data IAd1 output from the I-channel address queue 311 to the offset address Ad2 output from the address offset summer 327, to generate the I-channel address IADDR. Similarly, a Q-channel address summer 317 adds Q-channel data QAd1 output from the Q-channel address queue 313 to the offset address Ad2 output from the address offset summer 327, to generate the Q-channel address QADDR.

The I-channel lookup table 351 stores the predistortion values determined by measuring in advance the distortion caused by the I-channel data and the changes of the transmission power and the surrounding temperature of the transmitter. Similarly, the Q-channel lookup table 353 stores the predistortion values determined by measuring in advance the distortion caused by the Q-channel data and the changes of the transmission power and the surrounding temperature of the transmitter. The I-channel lookup table 351 reads and outputs the I-channel predistortion filter coefficient IPDD according to the I-channel address IADDR. Similarly, the Q-channel lookup table 353 reads and outputs the Q-channel predistortion filter coefficient QPDD according to the Q-channel address QADDR.

A reference filter coefficient generator 371 generates the reference filter coefficient. An adder 373 adds the reference filter coefficient to the I-channel predistortion data IPDD to generate the filter coefficient IFC to the baseband filter 201. Similarly, an adder 375 adds the reference filter coefficient to the Q-channel predistortion data QPDD to generate the filter coefficient QFC to the baseband filter 203.

Figure 4:
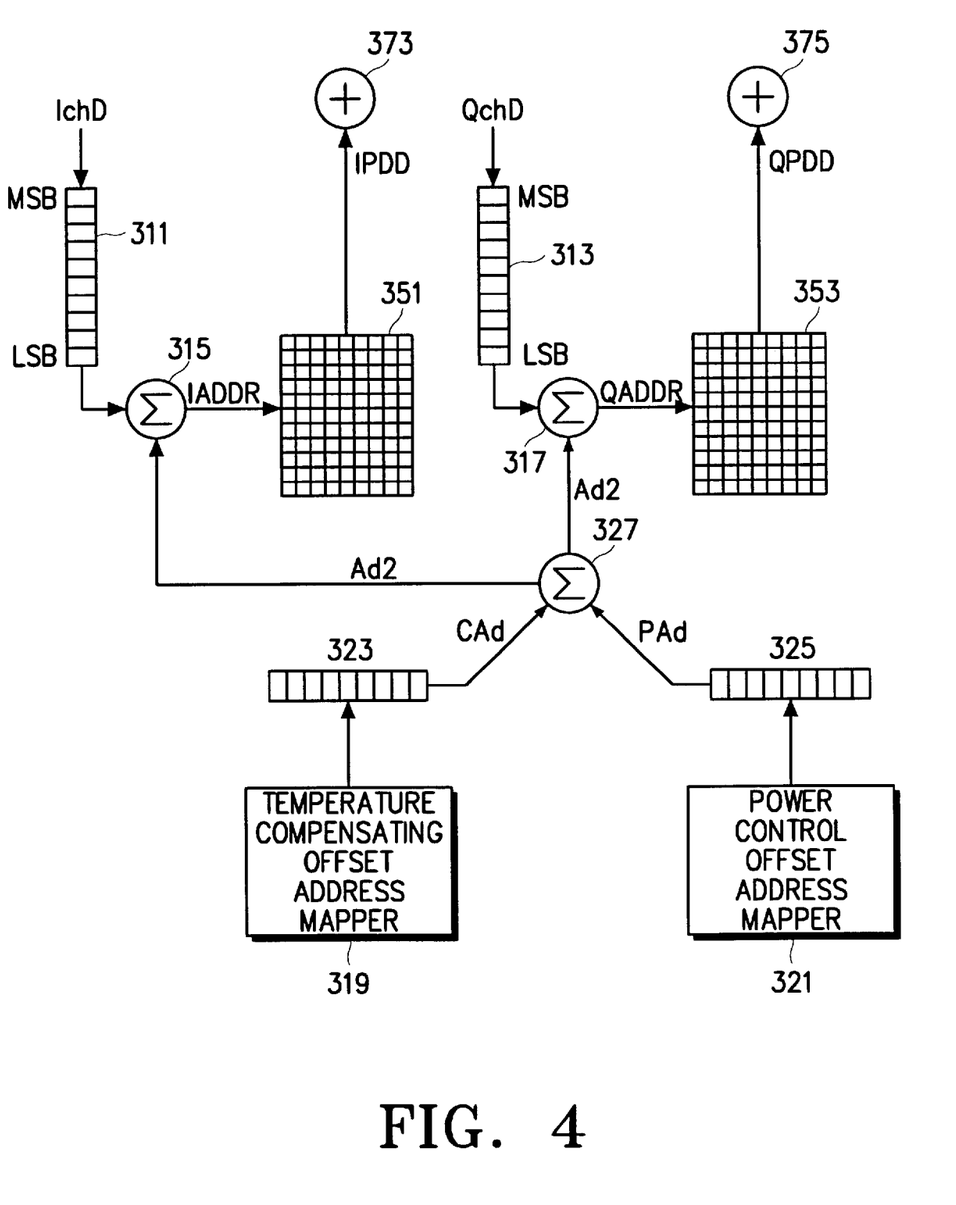
FIG. 4 illustrates how the predistortion data generation unit of FIG. 3 generates addresses.

FIG. 4 illustrates how to address the predistortion data generation unit 230 of the communication system as shown in FIG. 3. The I-channel data IchD is applied in common to the baseband filter 201 and the I-channel address queue 311, and the Q-channel data QchD is applied in common to the baseband filter 203 and the Q-channel address queue 313. Having the structure as shown in FIG. 4, the address queues 311 and 313 being both initialized to "0" at the beginning, receive the respective channel data IchD and QchD at the MSB and shift them by one bit to the LSB side upon receiving the next channel data IchD and QchD. Therefore, the address queues 311 and 313 automatically generate the addresses IAd1 and QAd1 according to the pattern of the channel data IchD and QchD. The addresses IAd1 and QAd1 output from the address queues 311 and 313 are input to the address summers 315 and 317, respectively. The address summers 315 and 317 generate the output addresses IADDR and QADDR in full consideration of the changes of the surrounding temperature and the transmission power, and provide them to the predistortion lookup tables 351 and 353, respectively.

The transmitter generates a control code for controlling an automatic gain control (AGC) amplifier depending on the power control information transmitted from the base station. Here, the power controller 227 generates the above stated control code with a specific number of bits, for controlling a gain of the AGC amplifier. For example, in a system such as IS-95, the communication terminal has 512 gain levels in maximum. However, actually, 80–400 of the 512 gain control levels are used. The output of the power controller 227 is input to the power control offset address mapper 321, and the power control offset address mapper 321 maps the output of the power controller 227 into the internal power offset table to generate the address according to the change of the transmission power, and generates the power offset address PAd through the power control offset address queue 325.

Further, the transmitter includes the temperature sensor 229 for sensing the surrounding temperature of the transmitter, to control the predistortion according to the change of the surrounding temperature. The temperature control offset address mapper 319 maps the temperature sensing signal into the internal temperature offset table to generate the address according to the change of the temperature, and then generates the temperature offset address CAd through the temperature control offset address queue 323.

Then, the address offset summer 327 sums up the two offset addresses PAd and CAd, and outputs the offset address Ad2 to both the I-channel and Q-channel address summers 315 and 317. The address summers 315 and 317 add the offset address Ad2 to the outputs of the address queues 311 and 313, respectively, to provide the final addresses IADDR and QADDR to the predistortion lookup tables 351 and 353. As a result, the predistortion lookup tables 351 and 353 store the temperature or power or both temperature and power compensated addresses, and output the predistortion filter coefficients IPDD and QPDD, respectively. The predistortion filter coefficients IPDD and QPDD are added to the reference filter coefficient by the adders 373 and 375, respectively, thereby generating the filter coefficients IFC and QFC to the baseband filters 201 and 203. Each one of the adders 373 and 375 is composed of 48 adder circuits, and can also be realized by a software program.

Then, the baseband filter 201 predistorts the input I-channel baseband data IchD and eliminates the sidelobe which affects the adjacent channel, according to the filter coefficient IFC output from the filter coefficient generator 235. Similarly, the baseband filter 203 predistorts the input Q-channel baseband data QchD and eliminates the sidelobe which affects the adjacent channel, according to the filter coefficient QFC output from the filter coefficient generator 235.

The predistorted baseband data output from the baseband filters 201 and 203 are distorted due to the non-linear amplification by the active elements of the transmitter, while passing the non-linear elements in the process of the digital-to-analog conversion, the modulation, the frequency-conversion, and the power amplification. However, being reversely predistorted by the baseband filters 201 and 203, the baseband signal will compensate for the distortion characteristics of the transmitter.

Now, the predistortion information stored in the predistortion lookup tables can be accessed as follows. First, the address former 231 forms the addresses IADDR and QADDR according to the I-channel and Q-channel baseband data IchD and QchD, and the power controller 227 generates the transmission power control signal according to the current transmission power level. Then, the memory 233 outputs the predistortion data stored in the predistortion lookup tables according to the baseband data and the transmission power control signal, and the filter coefficient generator 235 controls the filter coefficients IFC and QFC input to baseband filters 201 and 203, according to the predistortion data output from the memory 233, so as to predistort the I-channel and Q-channel baseband data IchD and QchD. In a cellular CDMA terminal, the power controller 227 controls the transmission power in 512 levels from 0 to 511, so that it can generate the transmission power control signal using this data. Moreover, the temperature sensor 229 senses the surrounding temperature of the transmitter in order to compensate for the change of the distortion characteristics of the transmitter according to the change of the surrounding temperature.

Figure 5:
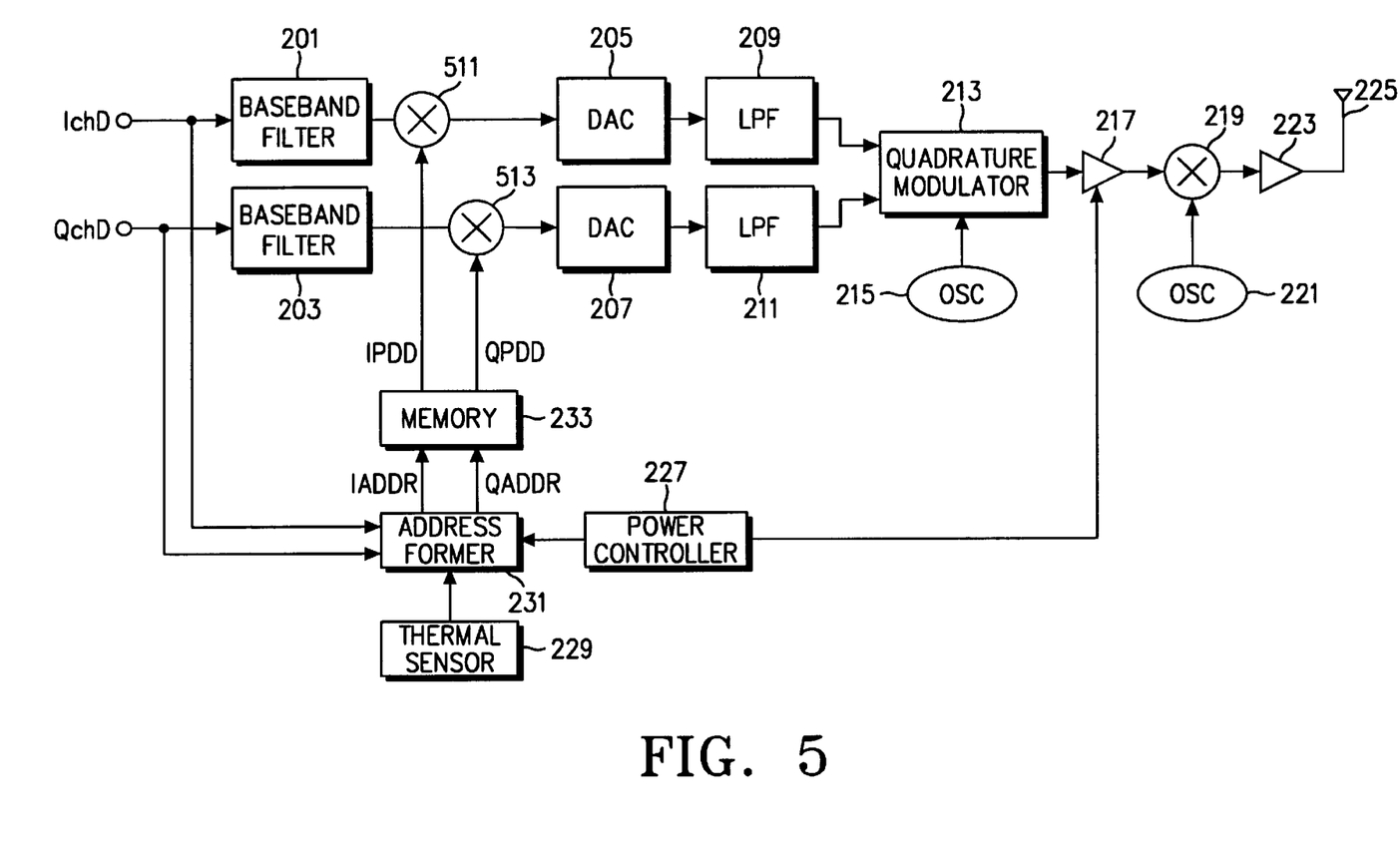
FIG. 5 is a block diagram of a communication system using a digital predistortion technique to compensate for distortion of a transmission signal according to a second embodiment of the present invention.

FIG. 5 illustrates a communication system using a digital predistortion technique to compensate for non-linear distortion characteristics of a transmission signal according to a second embodiment of the present invention. Referring to FIG. 5, the address former 231 forms the addresses IADDR and QADDR according to the input I-channel and Q-channel data IchD and QchD. The power controller 227 generates the transmission power control signal to the address former 231 under the control of a controller (not shown). The temperature sensor 229 senses the surrounding temperature of the transmitter and provides the address former 231 with the temperature sensing signal. The address former 231 receiving the baseband data IchD and QchD, generates the addresses IADDR and QADDR for addressing the predistortion lookup tables based on the baseband data IchD and QchD being reversely predistorted to make compensation for the distortion characteristics of the transmitter. Further, the address former 231 receiving the temperature sensing signal and the power control signal, generates the offset address to output the temperature and power compensated addresses IADDR and QADDR according to the changes of the surrounding temperature and the transmission power. Alternatively, the address former 231 can generate the addresses IADDR and QADDR depending on only the baseband data IchD and QchD, without using the temperature sensing signal from the temperature sensor 229 and the power control signal from the power controller 227. Alternatively, the address former 231 can generate the addresses IADDR and QADDR by using the baseband data IchD and QchD, together with any one of the temperature sensing signal and the power control signal.

The memory 233 has the I-channel and Q-channel predistortion lookup tables in which the whole distortion characteristics of the transmitter, measured in advance, are stored. The predistortion lookup tables store the predistortion data determined by measuring in advance the distortion characteristics while the I-channel and Q-channel baseband signals are amplified by the power amplifier. The memory 233 reads and outputs the I-channel and Q-channel predistortion coefficients IPDD and QPDD according to the addresses IADDR and QADDR output from the address former 231.

The baseband filter 201 shapes the input I-channel baseband data IchD, so as to restrict the sidelobe power which may affect the adjacent channel. Similarly, the baseband filter 203 shapes the input Q-channel baseband data QchD, so as to restrict the sidelobe power which may affect the adjacent channel.

A multiplier 511 multiplies an output of the baseband filter 201 by the I-channel predistortion coefficient IPDD output from the memory 233, to output the predistorted I-channel baseband data. Similarly, a multiplier 513 multiplies an output of the baseband filter 203 by the Q-channel predistortion coefficient QPDD output from the memory 233, to output the predistorted Q-channel baseband data.

The DAC 205 converts the predistorted I-channel baseband data output from the multiplier 511 into an analog baseband signal. Similarly, the DAC 207 converts the predistorted Q-channel baseband data output from the multiplier 513 into an analog baseband signal. The lowpass filter 209 lowpass-filters the I-channel baseband signal output of the DAC 205 to eliminate harmonics and spurious signals therefrom. Similarly, the lowpass filter 211 lowpass-filters the Q-channel baseband signal output of the DAC 207 to eliminate harmonics and spurious signals therefrom.

The quadrature modulator 213 modulates the predistorted I-channel and Q-channel baseband signals output from the lowpass filters 209 and 211 at a modulation frequency generated from the first oscillator 215. The gain control amplifier 217 amplifies the modulated transmission signal output of the quadrature modulator 213 according to the transmission power control signal generated from the power controller 227. The mixer 219 mixes an output signal of the gain control amplifier 217 with a carrier frequency output from a second oscillator 221, to up-convert the transmission output signal to the radio frequency.

The power amplifier 223 amplifies the transmission signal output from the mixer 219 up to a predetermined transmission level. Here, since the transmission output signal was predistorted in consideration of the whole distortion characteristics of the transmitter, the final transmission signal output of the power amplifier 223 may be free from the distortion. In summary, the communication system using a predistortion technique according to the second embodiment of the present invention predistorts the baseband data by multiplying the input baseband data IchD and QchD by the predistortion data IPDD and QPDD, respectively. Likewise, the distortion characteristics of the transmitter are measured in advance and stored in the predistortion lookup tables in the memory 233. Further, the address former 231 forms the addresses IADDR and QADDR by using the input baseband data IchD and QchD, the temperature sensing signal, and the transmission power control signal. The memory 233 outputs the predistortion data IPDD and QPDD according to the addresses IADDR and QADDR. The predistortion data IPDD and QPDD are multiplied by the outputs of the baseband filters 201 and 203, respectively.

Figure 6:
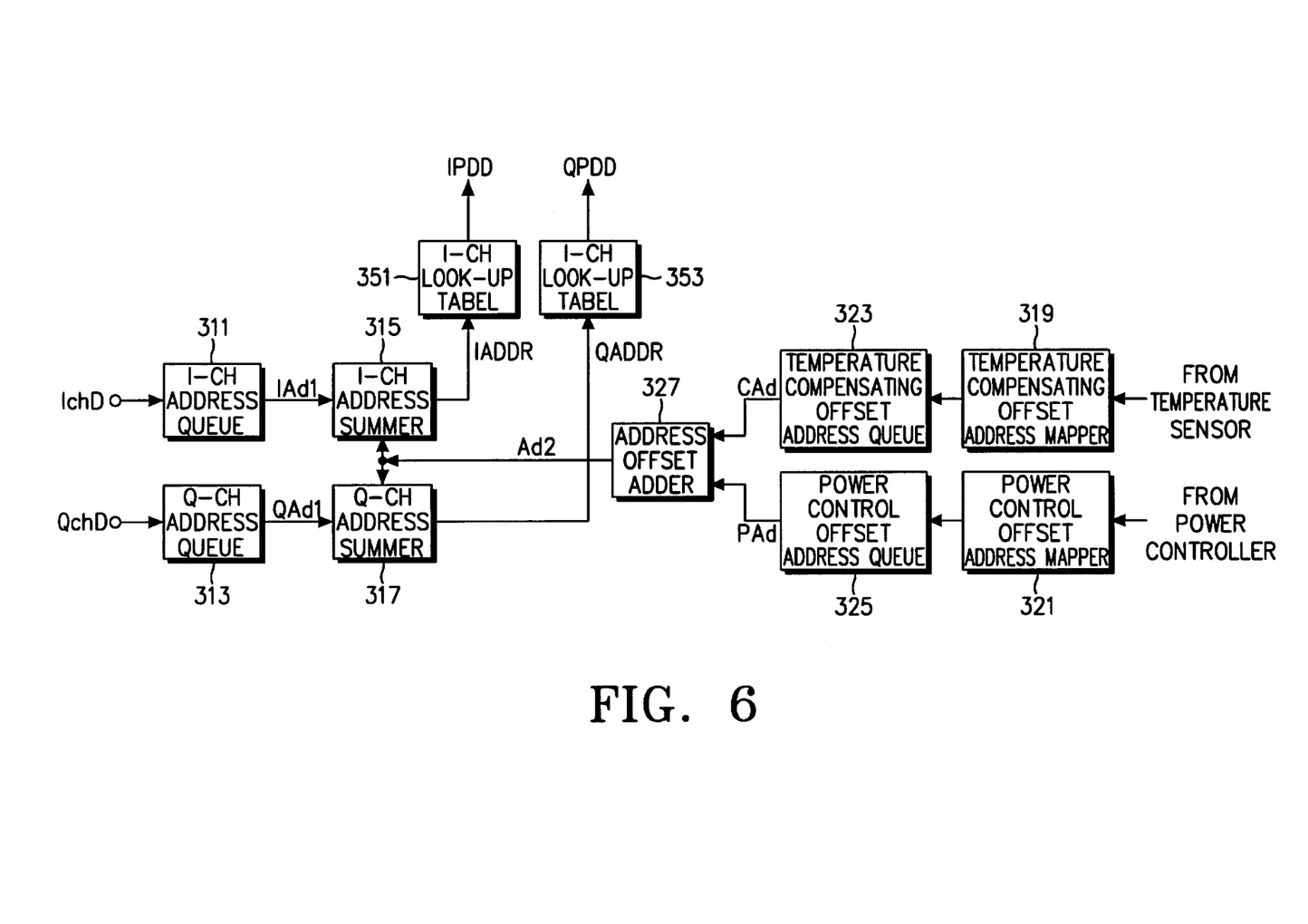
FIG. 6 is a block diagram of a predistortion data generation unit of FIG. 5.

FIG. 6 illustrates a detailed circuit diagram of a predistortion data generation unit 230 which consists of the address former 231 and the memory 233 as shown in FIG. 5. Referring to FIG. 6, the input baseband data IchD is applied in common to the baseband filter 201 and the I-channel address queue 311. Similarly, the input baseband data QchD is applied in common to the baseband filter 203 and the Q-channel address queue 313. The address queues 311 and 313 which are initialized at the beginning, shift the input baseband data IchD and QchD from the MSB towards the LSB. In case the transmitter does not employ the temperature and power compensation function, the outputs of the address queues 311 and 313 can be directly applied to predistortion lookup tables 351 and 353 as the addresses IADDR and QADDR.

The temperature compensating offset address mapper 319 includes the temperature offset address table for storing address offset values according to the surrounding temperature sensed, and maps the temperature sensing signal output from the temperature sensor 229 into the temperature offset table to output a temperature offset address. The power control offset address mapper 321 includes a power offset address table for storing address offset values according to the transmission power, and maps the transmission power control signal output from the power controller 227 into the power offset address table to output a power offset address. The temperature compensating offset address queue 323 which is initialized at the beginning, shifts the temperature offset address output from the temperature compensating offset address mapper 319 from the MSB to the LSB, to generate the temperature offset address CAd. The power control offset address queue 325 which is initialized at the beginning, shifts the power offset address output from the power control offset address mapper 321 from the MSB to the LSB, to output the power offset address PAd. The address offset summer 327 sums the offset addresses CAd and PAd output from the address queues 323 and 325 to generate the offset address Ad2.

The I-channel address summer 315 adds I-channel data IAd1 output from the I-channel address queue 311 to the offset address Ad2 output from the address offset summer 327, to generate the I-channel address IADDR. Similarly, the Q-channel address summer 317 adds Q-channel data QAd1 output from the Q-channel address queue 313 to the offset address Ad2 output from the address offset summer 327, to generate the Q-channel address QADDR.

The I-channel lookup table 351 stores the predistortion data determined by measuring the distortion characteristics of the transmitter according to the input I-channel data IchD and the changes of the transmission power and the surrounding temperature of the transmitter. Similarly, the Q-channel lookup table 353 stores the predistortion data determined by measuring the distortion characteristics of the transmitter according to the input Q-channel data QchD and the changes of the transmission power and the surrounding temperature of the transmitter. The I-channel lookup table 351 reads and outputs the I-channel predistortion filter coefficient IPDD according to the I-channel address IADDR. Similarly, the Q-channel lookup table 353 reads and outputs the Q-channel predistortion filter coefficient QPDD according to the Q-channel address QADDR.

It is noted that the predistortion data generation unit of FIG. 6 is different from that of FIG. 3 in that there is no filter coefficient generator. Therefore, as illustrated in FIG. 5, the baseband data IchD and QchD are shaped by the baseband filters 201 and 203, and then multiplied by the predistortion coefficients IPDD and QPDD at the multipliers 511 and 513, respectively, thus being predistorted.

In operation, the distortion characteristics of the transmitter are measured with respect to the input data and the transmission power, and stored in the predistortion lookup tables in the memory 233. The address former 231 converts the input data IchD and QchD and the offset values according to the changes of the surrounding temperature and the transmission power of the transmitter, so as to output the addresses IADDR and QADDR to the memory 233. The memory 233 outputs the predistortion coefficients IPDD and QPDD according to the addresses IADDR and QADDR.

Then, the multipliers 511 and 513 multiply the outputs of the baseband filters 201 and 203 by the predistortion coefficients IPDD and QPDD output from the memory 233, respectively, thereby generating the predistorted I-channel and Q-channel data. Being predistorted in opposition to the distortion characteristics of the active elements constituting the transmitter, the I-channel and Q-channel data can compensate for the distortion of the transmitter. The power amplifier 223 has the most significant influence on the distortion characteristics of the transmitter. The distortion characteristics of the transmitter depends on the power of the baseband signals input to the active elements and the shape of the input baseband data. Therefore, it is possible to measure the distortion characteristics of the transmitter based on the power of baseband signals input and output to and from the active elements and the shape of the input baseband data.

As described, the predistorted I-channel and Q-channel baseband data are distorted due to the non-linear amplification by the active elements, while passing through the non-linear elements of the transmitter during the process of the analog-to-digital conversion, the modulation, the frequency conversion, and the power amplification. However, being reversely predistorted by the baseband filters 201 and 203, the predistorted baseband data can compensate for the distortion characteristics of the transmitter. As a result, the communication system using a predistortion technique according to the second embodiment of the present invention generates the predistortion data according to the input baseband data and the changes of the surrounding temperature and the transmission power, and multiplies them by the outputs of the baseband filters to predistort the input baseband data, thereby compensating for the non-linear characteristics of the transmitter.

Figure 7:
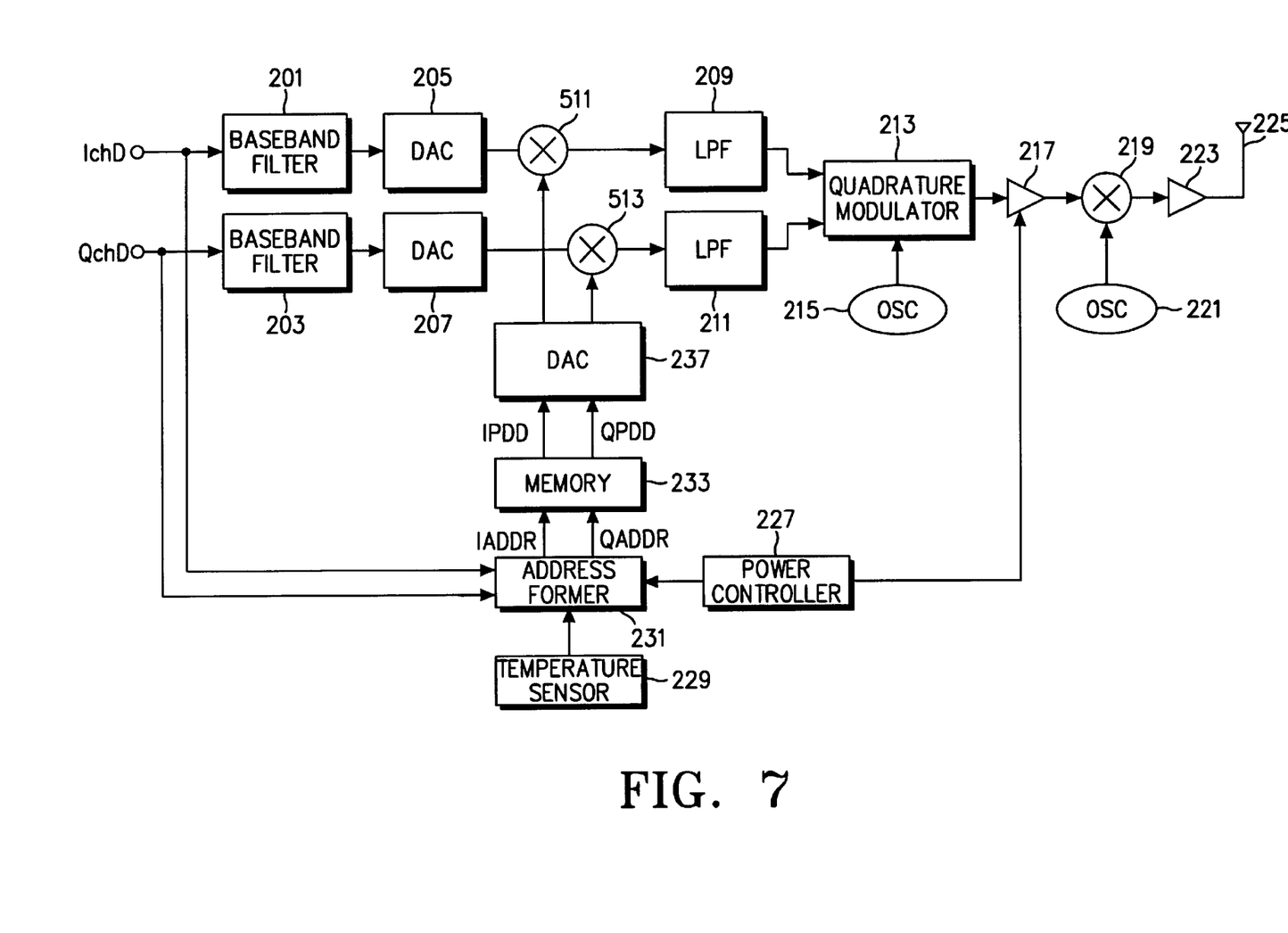
FIG. 7 is a block diagram of a communication system using a digital predistortion technique to compensate for distortion of a transmission signal according to a third embodiment of the present invention.

FIG. 7 illustrates a communication system using a predistortion technique to compensate for non-linear distortion characteristics of a transmission signal according to a third embodiment of the present invention. Referring to FIG. 7, the address former 231 forms the addresses IADDR and QADDR according to the input I-channel and Q-channel data IchD and QchD. The power controller 227 generates the transmission power control signal to the address former 231 under the control of a controller (not shown). The temperature sensor 229 senses the surrounding temperature of the transmitter and provides the address former 231 with the temperature sensing signal. The address former 231 receiving the baseband data IchD and QchD, generates the addresses IADDR and QADDR for addressing the predistortion lookup tables based on which the baseband data IchD and QchD are reversely predistorted to make compensation for the distortion characteristics of the transmitter. Further, the address former 231 receiving the temperature sensing signal and the power control signal, generates the offset address to output the temperature and power compensated addresses IADDR and QADDR according to the changes of the surrounding temperature and the transmission power. Alternatively, the address former 231 can generate the addresses IADDR and QADDR depending on only the baseband data IchD and QchD, without using the temperature sensing signal from the temperature sensor 229 and the power control signal from the power controller 227. Alternatively, the address former 231 can generate the addresses IADDR and QADDR using the baseband data IchD and QchD, together with any one of the temperature sensing signal and the power control signal.

The memory 233 has the I-channel and Q-channel predistortion lookup tables in which the whole distortion characteristics of transmitter, measured in advance, are stored. The predistortion lookup tables store the predistortion data determined by measuring in advance the distortion characteristics while the I-channel and Q-channel baseband signals are amplified by the power amplifier. The memory 233 reads and outputs the I-channel and Q-channel predistortion coefficients IPDD and QPDD according to the addresses IADDR and QADDR output from the address former 231.

The DAC 237 converts the predistortion coefficients IPDD and QPDD output from the memory 233 into analog predistortion signals. The baseband filter 201 shapes the input I-channel baseband data IchD, so as to restrict the sidelobe power which affects the adjacent channel. Similarly, the baseband filter 203 shapes the input Q-channel baseband data QchD, so as to restrict the sidelobe power which affects the adjacent channel.

The DAC 205 converts the I-channel baseband data output from the baseband filter 201 into an analog signal. Similarly, the DAC 207 converts the Q-channel baseband data output from the baseband filter 203 into an analog signal. The multiplier 511 multiplies an output of the DAC 205 by the I-channel predistortion signal output from the DAC 237, to output the predistorted I-channel baseband signal. Similarly, a multiplier 513 multiplies an output of the DAC 207 by the Q-channel predistortion signal output from the DAC 237, to output the predistorted Q-channel baseband signal.

The lowpass filter 209 lowpass-filters the predistorted I-channel baseband signal output from the multiplier 511 to eliminate harmonics and spurious signals therefrom. Similarly, the lowpass filter 211 lowpass-filters the predistorted Q-channel baseband signal output from the multiplier 513 to eliminate harmonics and spurious signals therefrom. The quadrature modulator 213 modulates the predistorted I-channel and Q-channel baseband signals output from the lowpass filters 209 and 211 at a modulation frequency generated from the first oscillator 215. The gain control amplifier 217 amplifies the modulated transmission signal output of the quadrature modulator 213 according to the transmission power control signal output from the power controller 227. The mixer 219 mixes an output signal of the gain control amplifier 217 with a carrier frequency output from the second oscillator 221, to up-convert the transmission output signal to the radio frequency.

The power amplifier 223 amplifies the transmission signal output from the mixer 219 up to a predetermined transmission level. Here, since the transmission output signal was predistorted in consideration of the whole distortion characteristics of the transmitter, the final transmission signal output of the power amplifier 223 may be free from the distortion.

In summary, the communication system using a predistortion technique according to the third embodiment of the present invention predistorts the baseband signal by multiplying the output signals of the DACs 205 and 207 by the predistortion signals output from the DAC 237, respectively. Likewise, the distortion characteristics of the transmitter are measured in advance and stored in the predistortion lookup tables in the memory 233. Further, the predistortion data generating circuit has the same construction as shown in FIG. 6. Thus, during data transmission, the address former 231 forms the addresses IADDR and QADDR for the memory 233 depending on the input baseband data IchD and QchD, the temperature sensing signal, and the transmission power control signal. The predistortion coefficients IPDD and QPDD output from the memory 233 are converted to analog predistortion signals and multiplied by the outputs of the DACs 205 and 207, respectively. In this way, the baseband signals output from the DACs 205 and 207 are predistorted.

As described above, the communication system of the invention predistorts the baseband signals using the predistortion lookup tables, so that it may have a simple hardware structure, which contributes to the miniaturization of the communication terminal. Further, the transmitter can compensate for the baseband distortion caused by the active elements according to the power control signal, the transmission signal will be free of any distortion. In particular, even though the power amplifier operates in the non-linear region, the transmitter can still prevent distortion of the transmission signal. In addition, since the power amplifier can operate even in the non-linear region, the power efficiency of the whole system can be improved, and as a result, the operable duration of the battery for the communication terminal can be extended.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A device for linearizing a transmitter using a predistortion technique in a communication system, comprising:

a memory including a predistortion lookup table storing predistortion data determined by measuring, in advance, distortion characteristics of the transmitter with respect to input baseband data;

an address former accommodating a forming of an address of the memory depending on the input baseband data;

a filter coefficient generator adding a reference filter coefficient to the predistortion data output from the memory to generate predistortion filter coefficients; and first and second baseband filters generating a predistorted baseband data output by predistorting and filtering the input baseband data according to said predistortion filter coefficients;

wherein the transmitter compensates for distortion characteristics caused by non-linear elements while the predistorted baseband data output from the baseband filters are modulated, up-converted, and amplified.

2. A device for linearizing a transmitter using a predistortion technique in a communication system, comprising:

a memory including a predistortion lookup table storing predistortion data determined by measuring, in advance, distortion characteristics of the transmitter with respect to input baseband data;

an address former accommodating a forming of an address of the memory depending on the input baseband data;

a filter coefficient generator adding a reference filter coefficient to the predistortion data output from the memory to generate predistortion filter coefficients; and first and second baseband filters generating a predistorted baseband data output by predistorting and filtering the input baseband data according to said predistortion filter coefficients;

wherein the transmitter compensates for distortion characteristics caused by non-linear elements while the predistorted baseband data output from the baseband filters are modulated, up-converted, and amplified;

wherein said predistortion lookup table further storing said predistortion data according to a change of transmission power of the transmitter.

3. The device of claim 2, wherein said address former comprising:

a power control offset address mapper including a power offset address table generating an offset address according to the change of the transmission power, and mapping a current transmission power into the power offset address table to generate a power offset address; and an address summer adding the power offset address to the baseband data to generate the address for the memory.

4. A device for linearizing a transmitter using a predistortion technique in a communication system, comprising:

a memory including a predistortion lookup table storing predistortion data determined by measuring, in advance, distortion characteristics of the transmitter with respect to input baseband data;

an address former accommodating a forming of an address of the memory depending on the input baseband data;

a filter coefficient generator adding a reference filter coefficient to the predistortion data output from the memory to generate predistortion filter coefficients; and first and second baseband filters generating a predistorted baseband data output by predistorting and filtering the input baseband data according to said predistortion filter coefficients;

wherein the transmitter compensates for distortion characteristics caused by non-linear elements while the predistorted baseband data output from the baseband filters are modulated, up-converted, and amplified;

wherein said predistortion lookup table further storing said predistortion data according to a change of surrounding temperature of the transmitter.

5. The device of claim 4, wherein said address former comprising:

a temperature compensating offset address mapper including a temperature offset address table generating an offset address according to the change of the surrounding temperature, and mapping a current surrounding temperature into the temperature offset address table to generate a temperature offset address; and an address summer adding the temperature offset address to the baseband data to generate the address for the memory.

6. A device for linearizing a transmitter using a predistortion technique in a communication system, comprising:

a memory including a predistortion lookup table storing predistortion data determined by measuring, in advance, distortion characteristics of said transmitter with respect to input baseband data;

an address former accommodating a forming of addresses for said memory depending on the input baseband data;

a multiplier accommodating a multiplying of the input baseband data by the predistortion data to generate predistorted baseband data;

a converter accommodating converting of an output of said multiplier to an analog baseband signal;

a lowpass filter accommodating a lowpass filtering of an output of said converter to produce a predistorted baseband transmission signal; and said transmitter modulating, up-converting, and power-amplifying the predistorted baseband transmission signal, wherein said predistorted baseband transmission signal is offset by a distortion signal caused by non-linear elements of said transmitter, so that a final transmission signal is free from distortion;

wherein said predistortion lookup table further storing said predistortion data according to a change of transmission power of said transmitter;

wherein said address former comprising:

a power control offset address mapper including a power offset address table generating an offset address according to the change of the transmission power, and mapping a current transmission power into the power offset address table to generate a power offset address; and an address summer adding the power offset address to the baseband data to generate each address for the memory.

7. A device for linearizing a transmitter using a predistortion technique in a communication system, comprising:

a memory including a predistortion lookup table storing predistortion data determined by measuring, in advance, distortion characteristics of said transmitter with respect to input baseband data;

an address former accommodating a forming of addresses for said memory depending on the input baseband data;

a multiplier accommodating a multiplying of the input baseband data by the predistortion data to generate predistorted baseband data;

a converter accommodating converting of an output of said multiplier to an analog baseband signal;

a lowpass filter accommodating a lowpass filtering of an output of said converter to produce a predistorted baseband transmission signal; and said transmitter modulating, up-converting, and power-amplifying the predistorted baseband transmission signal, wherein said predistorted baseband transmission signal is offset by a distortion signal caused by non-linear elements of said transmitter, so that a final transmission signal is free from distortion;

wherein said predistortion lookup table further storing said predistortion data according to a change of surrounding temperature of said transmitter;

wherein said address former comprising:
- a temperature compensating offset address mapper including a temperature offset address table generating an offset address according to the change of the surrounding temperature, and mapping a current surrounding temperature into the temperature offset address table to generate a temperature offset address; and
- an address summer adding the temperature offset address to the baseband data to generate each address for the memory.

8. A device for linearizing a transmitter using a predistortion technique in a communication system, comprising:
- a memory including a predistortion lookup table storing predistortion data determined by measuring, in advance, distortion characteristics of said transmitter with respect to input baseband data;
- an address former accommodating forming of addresses for said memory depending on the input baseband data;
- a converter accommodating converting the input baseband data to an analog baseband signal;
- a multiplier accommodating multiplying the analog baseband signal by the predistortion data to generate a predistorted transmission signal;
- a lowpass filter accommodating lowpass filtering of the predistorted transmission signal to produce a baseband transmission signal; and
- said transmitter modulating, up-converting, and power-amplifying the baseband transmission signal, wherein said baseband transmission signal is offset by a distortion signal caused by non-linear elements of said transmitter, so that a final transmission signal is free from distortion.

9. A device for linearizing a transmitter using a predistortion technique in a communication system, comprising:
- a memory including a predistortion lookup table storing predistortion data determined by measuring, in advance, distortion characteristics of said transmitter with respect to input baseband data;
- an address former accommodating forming of addresses for said memory depending on the input baseband data;
- a converter accommodating converting the input baseband data to an analog baseband signal;
- a multiplier accommodating multiplying the analog baseband signal by the predistortion data to generate a predistorted transmission signal;
- a lowpass filter accommodating lowpass filtering of the predistorted transmission signal to produce a baseband transmission signal; and
- said transmitter modulating, up-converting, and power-amplifying the baseband transmission signal, wherein said baseband transmission signal is offset by a distortion signal caused by non-linear elements of said transmitter, so that a final transmission signal is free from distortion;
- wherein said predistortion lookup table further storing said predistortion data according to a change of transmission power of said transmitter.

10. The device of claim 9, wherein said address former comprising:
- a power control offset address mapper including a power offset address table generating an offset address according to the change of the transmission power, and mapping a current transmission power into the power offset address table to generate a power offset address; and
- an address summer adding the power offset address to the baseband data to generate each address for said memory.

11. A device for linearizing a transmitter using a predistortion technique in a communication system, comprising:
- a memory including a predistortion lookup table storing predistortion data determined by measuring, in advance, distortion characteristics of said transmitter with respect to input baseband data;
- an address former accommodating forming of addresses for said memory depending on the input baseband data;
- a converter accommodating converting the input baseband data to an analog baseband signal;
- a multiplier accommodating multiplying the analog baseband signal by the predistortion data to generate a predistorted transmission signal;
- a lowpass filter accommodating lowpass filtering of the predistorted transmission signal to produce a baseband transmission signal; and
- said transmitter modulating, up-converting, and power-amplifying the baseband transmission signal, wherein said baseband transmission signal is offset by a distortion signal caused by non-linear elements of said transmitter, so that a final transmission signal is free from distortion;
- wherein said predistortion lookup table further storing said predistortion data according to a change of surrounding temperature of said transmitter.

12. The device of claim 11, wherein said address former comprising:
- a temperature compensating offset address mapper including a temperature offset address table generating an offset address according to the change of the surrounding temperature, and mapping a current surrounding temperature into the temperature offset address table to generate a temperature offset address; and
- an address summer adding the temperature offset address to the baseband data to generate each address for said memory.

13. A method for linearizing a transmitter using a predistortion technique in a communication system having a predistortion lookup table for storing predistortion data determined by measuring, in advance, distortion characteristics of the transmitter with respect to input baseband data and transmission power, said method comprising the steps of:
- forming an address according to the input baseband data and a transmission power control signal;
- reading the predistortion data from the predistortion lookup table according to the address and outputting the read predistortion data as a filter coefficient; and
- lowpass filtering the input baseband data and predistorting the baseband data according to said filter coefficient, so as to compensate the distortion characteristics caused by non-linear elements of the transmitter.

* * * * *